(12) United States Patent
Cooke et al.

(10) Patent No.: US 6,366,070 B1
(45) Date of Patent: Apr. 2, 2002

(54) SWITCHING VOLTAGE REGULATOR WITH DUAL MODULATION CONTROL SCHEME

(75) Inventors: Philip R. Cooke, San Jose, CA (US); Richard Redl, Farvagny-le-Petit (CH)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/903,942

(22) Filed: Jul. 12, 2001

(51) Int. Cl.[7] .............................. G05F 1/44; G05F 1/56
(52) U.S. Cl. .................... 323/284; 323/285; 323/222
(58) Field of Search ............................... 323/282, 284, 323/285, 222, 290

(56) References Cited

U.S. PATENT DOCUMENTS

| | | | | |
|---|---|---|---|---|
| 4,940,929 A | * | 7/1990 | Williams | 323/222 |
| 5,336,985 A | * | 8/1994 | McKenzie | 323/266 |
| 5,548,206 A | * | 8/1996 | Soo | 323/284 |
| 6,185,082 B1 | * | 2/2001 | Yang | 361/90 |
| 6,198,265 B1 | * | 3/2001 | Stevenson | 323/288 |
| 6,229,289 B1 | * | 5/2001 | Piovaccari et al. | 323/268 |
| 6,285,146 B1 | * | 9/2001 | Harlan | 318/254 |

OTHER PUBLICATIONS

Linear Technology, High Power No $R_{SENSE}{}^{TM}$ Current Mode Synchronous Step–Down Switching Regulator, LTC1775, pp. 1–24 (1999) No month.

Linear Technology, High Power No $R_{SENSE}{}^{TM}$ Current Mode Synchronous Step–Down Switching Regulator, LTC1625, pp. 1–24 (1998) No month.

* cited by examiner

Primary Examiner—Bao Q. Vu
(74) Attorney, Agent, or Firm—Koppel & Jacobs

(57) ABSTRACT

A switching voltage regulator employs a "dual modulation" scheme to control the regulator's switching components. A control circuit indirectly monitors load current. When the load decreases, the control circuit reduces both the duty ratio and the frequency of the control signals which operate the switching transistors, thereby maintaining a high efficiency level over a wider output current range than can be achieved with fixed-frequency control signals. In a preferred embodiment, the regulator employs three operating modes. For heavy loads, the switching components are operated at a constant frequency. For moderate-to-light loads, the dual modulation control scheme is used. For light loads, the regulator enters a "pulse-skipping" mode which can achieve very low operating frequencies to further improve efficiency. The invention may be used with switching regulators using peak current mode, average current mode, or voltage mode control, as well as buck, buck-boost, and boost power stages.

32 Claims, 8 Drawing Sheets

SWITCHING VOLTAGE REGULATOR WITH DUAL MODULATION CONTROL SCHEME

BACKGROUND OF THE INVENTION

1. Field of the Invention

This invention relates to the field of switching voltage regulators, and particularly to control schemes for such regulators.

2. Description of the Related Art

Switching voltage regulators are widely used due to their high efficiency, which makes them particularly suitable for use in battery-powered devices such as laptop computers. However, despite the inherent efficiency of switching regulators, efforts are ongoing on many fronts to achieve ever better efficiencies, so that the life of the battery in such battery-powered devices can be extended.

A switching regulator operates by switching current through an inductor on and off repetitively. A transistor typically serves as the switch, the state of which is controlled with a fixed-frequency control signal applied to the transistor's base or gate. The regulator's output voltage is typically maintained by adjusting the duty ratio of the control signal provided to the transistor. This technique tends to provide a satisfactory efficiency level when the regulator is driving a heavy load with an output current at or near the regulator's rated maximum. However, when the load decreases to a moderate or light level, the efficiency of the regulator also decreases; this is because the switching components continue to be toggled at the same fixed frequency, while the regulator provides less output current.

SUMMARY OF THE INVENTION

A switching voltage regulator is presented which overcomes the problems noted above, providing high efficiency operation for heavy loads, as well as moderate and light loads.

The novel regulator employs a "dual modulation" scheme to control the regulator's switching components. A control circuit monitors load current. If the load decreases, the control circuit reduces both the duty ratio and the frequency of the control signals which operate the switching transistors. Similarly, an increasing load current results in an increase in the duty ratio and frequency of the control signals. By varying both duty ratio and frequency with a varying load current, the regulator maintains a high efficiency level over a wider output current range than can be achieved with fixed-frequency control signals.

In a preferred embodiment, the regulator employs three operating modes. For heavy loads, the switching components are operated at a constant frequency. For moderate-to-light loads, the dual modulation control scheme is used. For very light loads, the regulator enters a "pulse-skipping" mode which can achieve very low operating frequencies to further improve efficiency.

The invention may be used with switching regulators which use peak current mode, average current mode, or voltage mode control, as well as buck, buck-boost, and boost power stages.

Further features and advantages of the invention will be apparent to those skilled in the art from the following detailed description, taken together with the accompanying drawings.

DETAILED DESCRIPTION OF THE INVENTION

Figure 1:
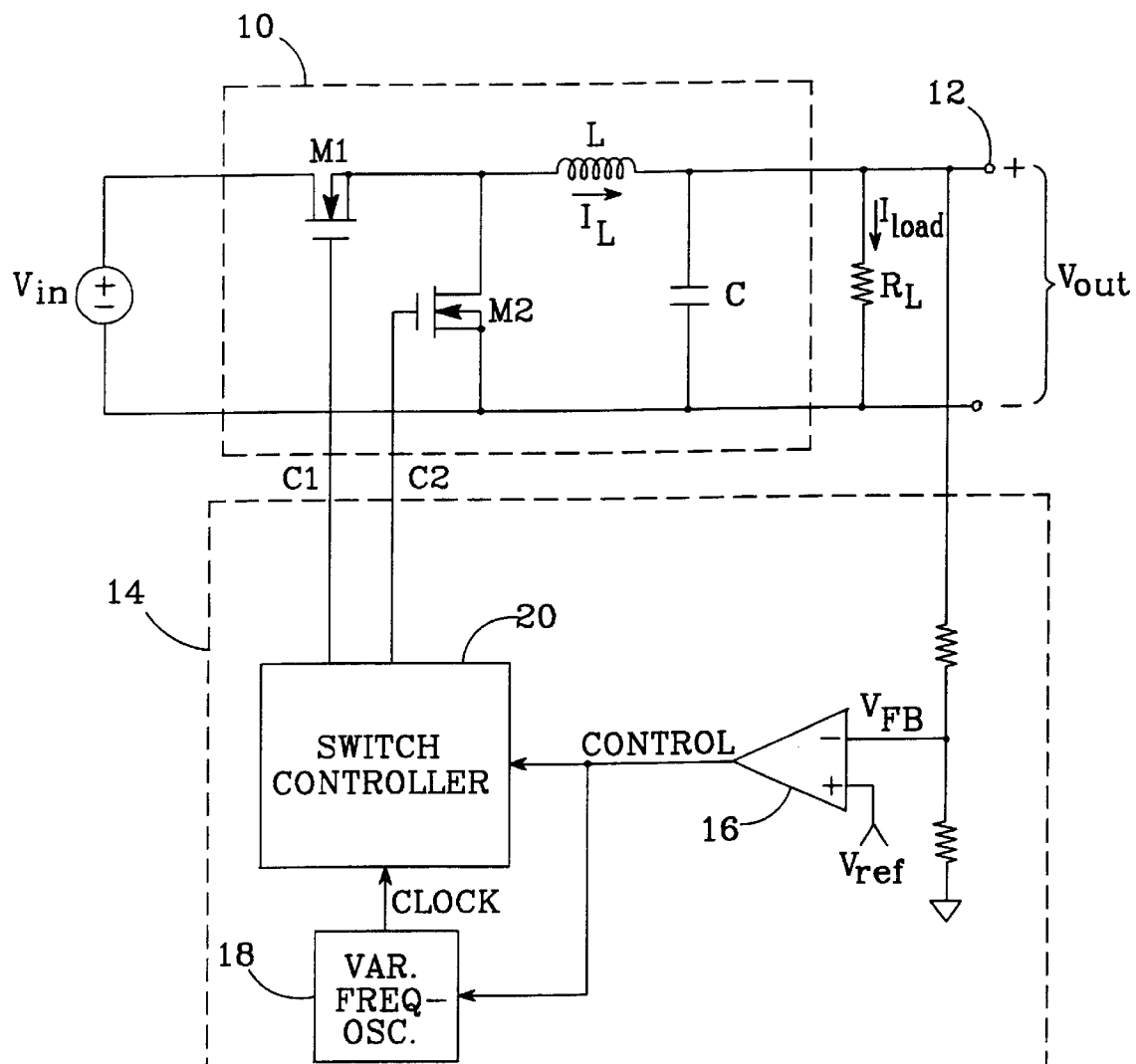
FIG. 1 is a schematic diagram of a switching voltage regulator in accordance with the present invention.
Figure 1:
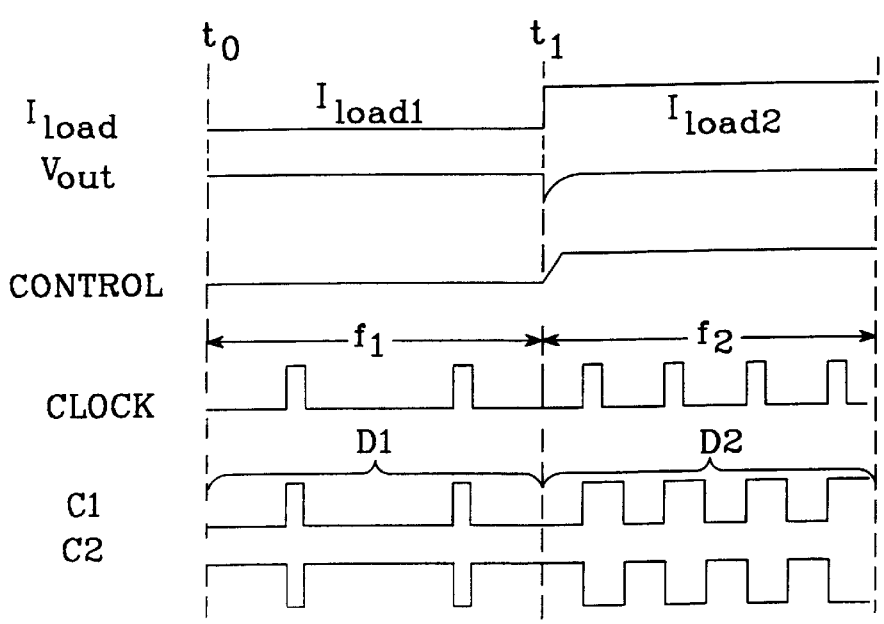

A switching regulator per the present invention is shown in FIG. 1. The regulator includes an exemplary power stage 10, which includes a pair of switching transistors M1 and M2, an inductor L, and an output capacitor C. Power stage 10 is connected between an input voltage $V_{in}$ and an output terminal 12. In operation, M1 and M2 are switched on and off with complementary control signals C1 and C2: when M1 is closed, it conducts current from $V_{in}$ to inductor L such that the inductor current $I_L$ increases; when M2 is closed, it conducts current from circuit common to inductor L, decreasing $I_L$. The changing current in L produces an output voltage $V_{out}$ at output terminal 12, which is connected to drive a load $R_L$ with a load current $I_{load}$.

Control signals C1 and C2 are produced by a control circuit 14. Conventionally, C1 and C2 toggle at a constant frequency, and $V_{out}$ is regulated by varying the duty ratio of the control signals. As used herein, the "duty ratio" D is the amount of time switch M1 is turned on ($t_{on}$) with respect to the total switching period $T_S$—i.e., $D=t_{on}/T_S$; the duty ratio is also commonly referred to as the "duty cycle". (Note that, because C1 and C2 are complementary, the duty ratio for M2 is given by 1-D; however, for simplicity, only M1's duty ratio is referred to hereinafter).

Control circuit 14 includes an amplifier 16. The amplifier receives a voltage $V_{FB}$ at one input which varies with $V_{out}$, a voltage $V_{ref}$ at a second input which represents the desired output voltage, and produces an output CONTROL which varies with the difference between $V_{FB}$ and $V_{ref}$. Control circuit 14 also includes a variable frequency oscillator circuit 18 which produces a periodic output signal CLOCK, the frequency f of which varies with CONTROL. Both the CLOCK signal and the CONTROL signal are provided to a switch controller 20, which produces C1 and C2.

Switch controller 20 is arranged to vary both the duty ratio and the frequency of control signals C1 and C2 in accordance with the CLOCK and CONTROL signals. It is known that a switching regulator's output voltage is an indication of the level of the load being driven. Here, $V_{out}$, and thus the CONTROL output from amplifier 16, vary with load $R_L$: as $V_{out}$ falls, indicating an increasing load, the value of CONTROL increases; similarly, CONTROL decreases for a decreasing load.

The variable frequency oscillator circuit 18 is arranged to vary the frequency f of CLOCK with the CONTROL signal, such that f decreases for a decreasing load and increases for an increasing load. At the same time, switch controller 20 is arranged to vary the duty ratio of control signals C1 and C2 with the value of CONTROL: the duty ratio (of C1) decreases for a decreasing CONTROL value (and load current), and increases for an increasing CONTROL value (and load current). In this way, both the frequency and duty ratio of the switch control signals are controlled with a single signal: CONTROL. Varying the frequency and duty ratio of the switch control signals with a varying load current is referred to herein as "dual modulation" control.

Operation of the novel regulator is illustrated with reference to the timing diagram in FIG. 1. At time $t_0$, the load current $I_{load}$ has an initial steady-state value $I_{load1}$. $V_{out}$ is also at a desired steady-state value, as is the value of CONTROL produced by amplifier 16. This value of CONTROL results in variable frequency oscillator circuit 18 producing a CLOCK signal with a frequency $f_1$. This CONTROL value also results in switch controller 20 producing complementary control signals C1 and C2 which toggle at frequency $f_1$, with C1 having a duty ratio D1.

Load current $I_{load}$ changes at time $t_1$—it is shown increasing to $I_{load2}$ in FIG. 1. As noted above, an increase in load results in a corresponding drop in output voltage $V_{out}$, which in turn causes CONTROL to increase. This new CONTROL value causes variable frequency oscillator circuit 18 to produce a CLOCK signal with a higher frequency $f_2$, which in turn causes control signals C1 and C2 to toggle at higher frequency $f_2$. The higher CONTROL value also affects the duty ratio of control signals C1 and C2, with C1's duty ratio increasing to a new value D2. These changes to the frequency and duty ratio of control signals C1 and C2 cause $V_{out}$ to recover from its initial drop and return to the desired output voltage. By varying both the frequency and duty ratio of the switch control signals, the regulator operates at a higher efficiency over a wider load range than can be achieved by prior art control schemes.

Note that, though FIG. 1 depicts a "buck"-type power stage, the invention is equally useful with other power stage types, including "boost" and "buck-boost" types. Also, it is not essential that a power stage in a regulator per the present invention include two switches: if synchronous rectification is not needed, the second switch can be replaced by a diode. These alternative power stages are discussed in more detail below.

Figure 2:
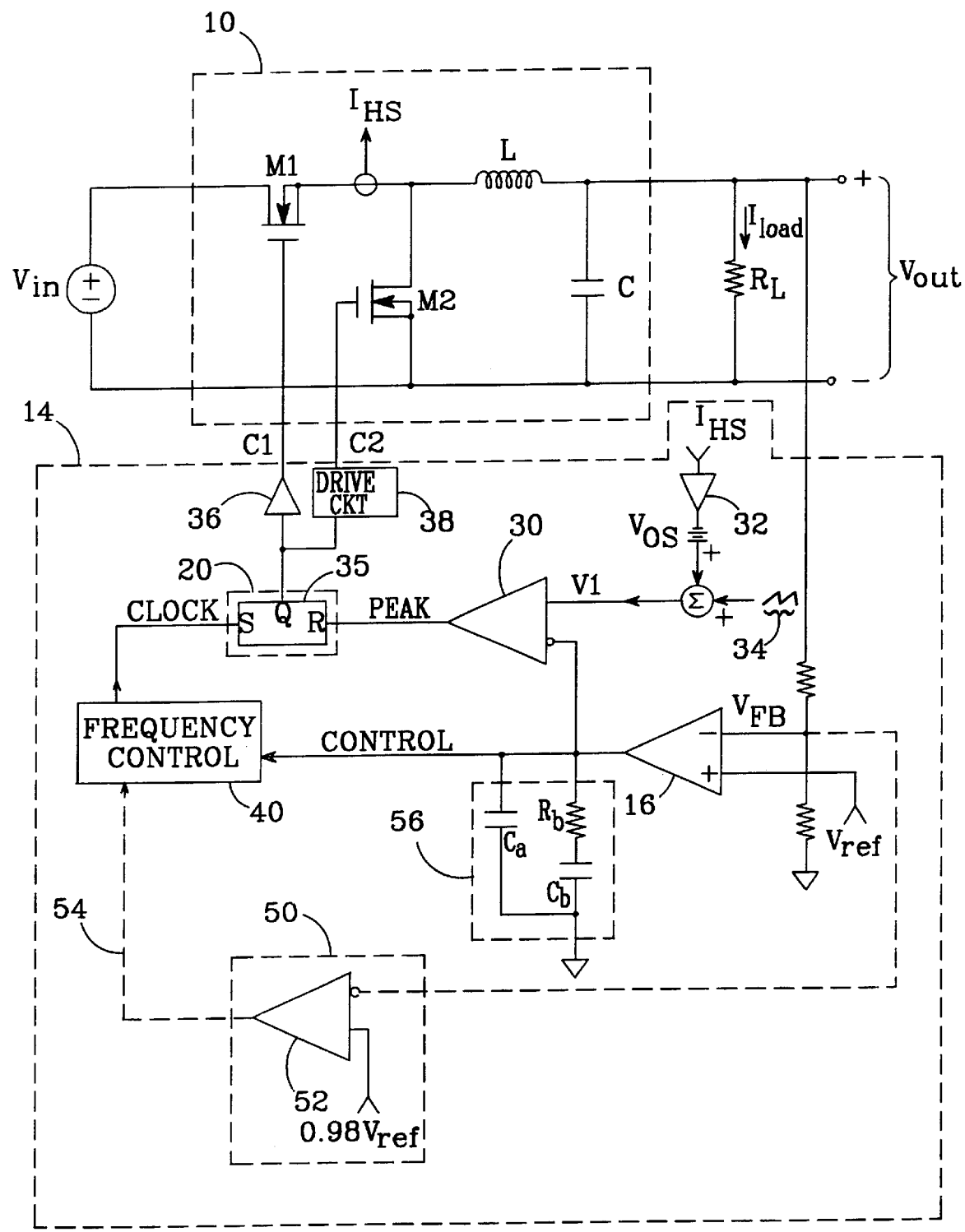
FIG. 2 is a schematic diagram of a switching voltage regulator per the present invention which employs peak current mode control.

A preferred embodiment of the invention is shown in FIG. 2. As before, the regulator includes an exemplary power stage 10, with switching transistors M1 and M2 controlled by a control circuit 14. The power stage and control circuit in combination form a switching voltage regulator that produces an output voltage $V_{out}$, which drives a load $R_L$ with a load current $I_{load}$. Control circuit 14 includes an amplifier 16, which receives a reference voltage $V_{ref}$ and a feedback voltage $V_{FB}$ at its inputs, and produces an output CONTROL which varies with the difference between its inputs.

The circuit topology shown in FIG. 2 employs "peak current mode" control of the regulator. In an exemplary implementation of this control mode, a pulse-width modulated (PWM) comparator 30 receives the CONTROL signal at an inverting input, and a signal V1 which varies with the current in inductor L. Signal V1 is produced by sensing the current $I_{HS}$ through the high side of switch M1, amplifying $I_{HS}$ with a gain stage 32, adding a DC offset $V_{OS}$, and preferably summing the result with a slope compensation waveform 34, which improves the stability of the closed loop when the duty ratio exceeds about 40%. PWM comparator 30 produces an output PEAK, which is connected to switch controller 20—here implemented with a set-reset (SR) flip-flop 35. The output Q of flip-flop 35 is connected to a driver 36 and a drive circuit 38, which generate control signals C1 and C2, respectively.

Figure 4:
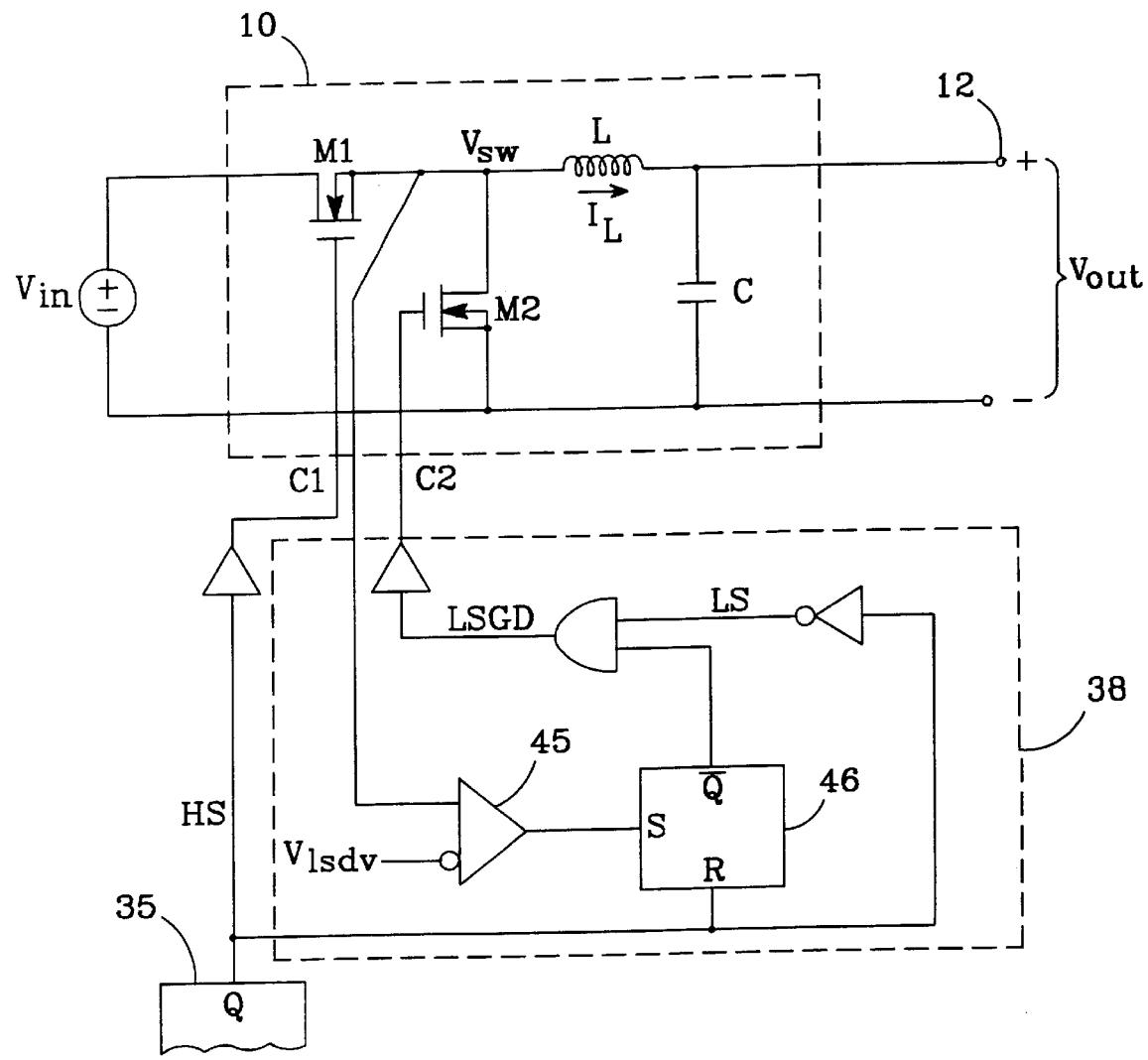
FIG. 4 is a schematic diagram of a CCM/DCM detection circuit suitable for use with the present regulator.
Figure 4:
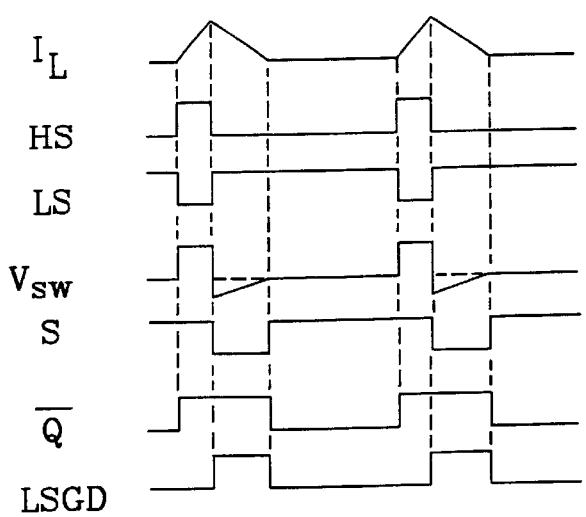

When the regulator operates in "continuous inductor current mode" (CCM), in which the inductor current remains greater than zero during a switching cycle, drive circuit 38 serves as an inverting driver such that control signals C1 and C2 are complementary. However, when the regulator operates in "discontinuous inductor current mode" (DCM), which occurs when the inductor current reaches zero before the end of a switching cycle, drive circuit 38 is preferably arranged to keep transistor M2 off except when the inductor current is greater than zero, to prevent the discharge of output capacitor C. One possible implementation of drive circuit 38 is shown in FIG. 4 and discussed below.

The CONTROL signal is also connected to a frequency control circuit 40. Circuit 40 includes variable frequency oscillator circuit 18, and produces periodic output CLOCK with a frequency f which varies with the value of CONTROL. The CLOCK signal from frequency control circuit 40 is connected to the "set" input of flip-flop 35, and the PEAK signal from the PWM comparator is connected to the flip-flop's "reset" input.

In operation, the CLOCK signal sets flip-flop 35 and its Q output goes high at the beginning of each switching cycle, thereby turning on high side switch M1 and turning off switch M2. This connects $V_{in}$ to inductor L, and the inductor current $I_{HS}$ begins to increase. This results in signal V1 increasing, after a DC offset and slope compensation have been added to the amplified sensed inductor current. As noted above, the CONTROL signal varies with the load current $I_{load}$. When the inductor current increases to the point at which V1 equals CONTROL, the PEAK output of PWM comparator 30 resets flip-flop 35. This loop thus effectively adjusts the duty ratio of control signal C1 to control the peak current level in the inductor and thereby maintain a desired output voltage $V_{out}$.

Note, however, that CONTROL is also connected to frequency control circuit 40, which varies the frequency of CLOCK—and thus of control signals C1 and C2—with the value of CONTROL. This provides dual modulation control: as the load current varies, so too does the value of CONTROL, which in turn affects the duty ratio (by adjusting the timing of the PEAK signal) and the frequency (by adjusting the frequency of the CLOCK signal) of control signals C1 and C2. That is, as $I_{load}$ increases, frequency f and the duty ratio of C1 also increase. When $I_{load}$ decreases, frequency f and the duty ratio of C1 also decrease. In this way, the regulator's efficiency is maintained at a high level over a wide load range, and its power consumption is correspondingly reduced. If input voltage $V_{in}$ is provided by a battery, as in a portable device such as a laptop computer, the reduced power consumption provided by the invention tends to extend the life of the battery.

The dual modulation control scheme described above is preferably used as one operating mode of a regulator which has multiple operating modes. For example, a regulator per the present invention can have two modes: a fixed-frequency mode (Mode I) used when driving heavy loads, and the dual modulation mode (Mode II) for driving moderate-to-light loads. The control circuit is arranged to detect when a transition between modes should occur (discussed in detail below). In Mode I, the frequency of control signals C1 and C2 is constant, and $V_{out}$ is regulated by varying the duty ratio only. In mode II, both frequency and duty ratio are varied to regulate $V_{out}$.

Even greater efficiencies are achieved using a preferred tri-mode regulator. Here, in addition to Modes I and II, the regulator has a third mode (Mode III) for use under light-to-no load conditions, which can achieve very low operating frequencies to further improve efficiency.

Figure 3A:
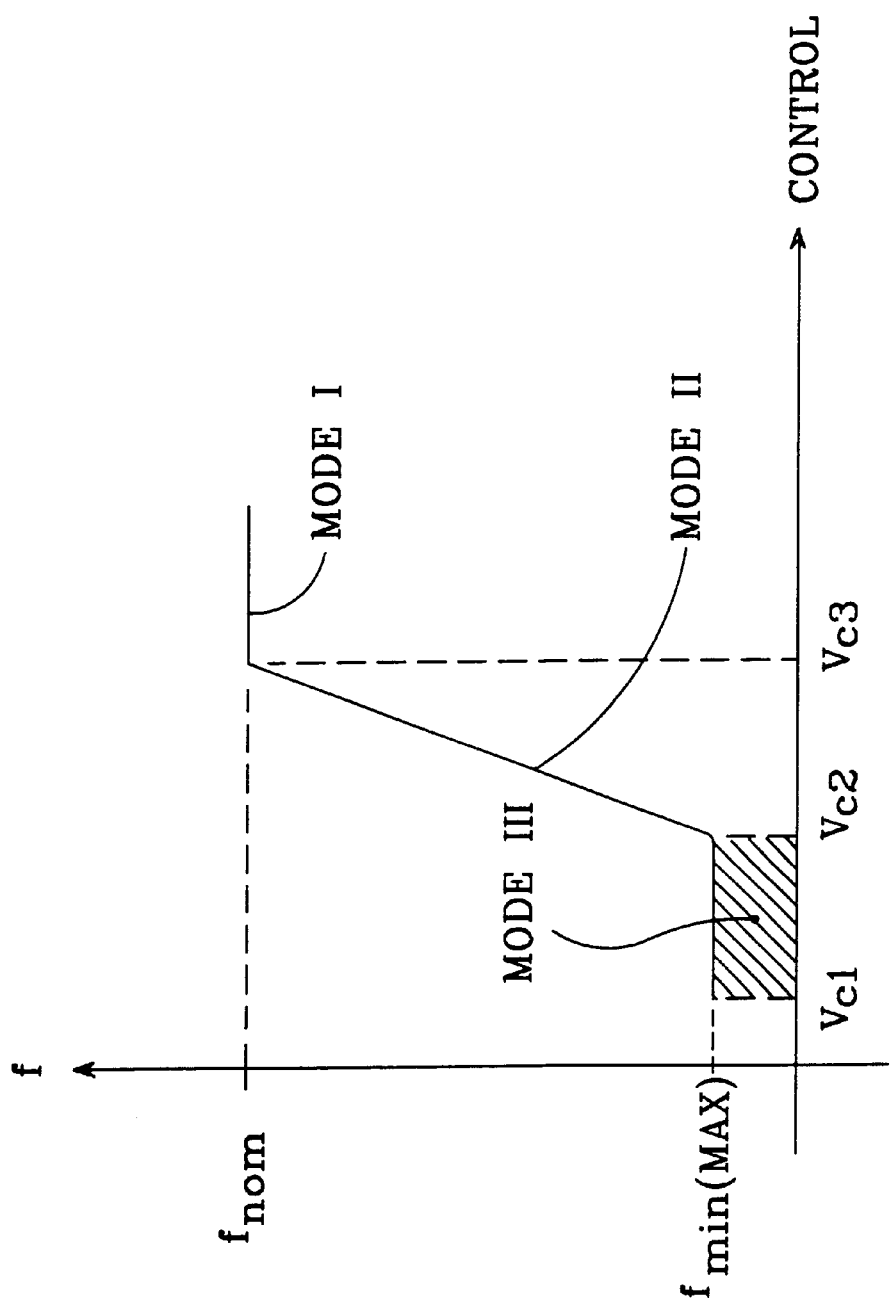
FIG. 3a is a graph illustrating the operation of a regulator per the present invention which employs tri-mode control.

There are numerous methods by which transitions from one mode to another can be triggered. One method uses the voltage of the CONTROL signal, as sensed by frequency control circuit 40, to trigger transitions between modes. The operation of a tri-mode regulator employing this triggering method is illustrated in FIG. 3a. When the voltage of the CONTROL signal is at or above a predetermined threshold $V_{C3}$, indicative of a heavy load, frequency control circuit 40 provides CLOCK at a constant nominal frequency $f_{nom}$ and the regulator operates in Mode I. When the CONTROL voltage is between $V_{C3}$ and another predetermined threshold voltage $V_{C2}$, indicative of a moderate-to-light load, dual modulation operation (Mode II) begins: frequency control circuit 40 varies the frequency of CLOCK with the CONTROL voltage. The regulator enters Mode III when the CONTROL voltage is below $V_{C2}$: frequency control circuit 40 continues to vary CLOCK with CONTROL, with the frequency of CLOCK kept at a frequency of $f_{min(MAX)}$ or less.

The regulator's switching frequency can be reduced below $f_{min(MAX)}$ using a "pulse-skipping" mode. This occurs when an extremely light load or no load cause CONTROL to be less than the V1 voltage applied to PWM comparator 30, which keeps the reset input of flip-flop 35 asserted. If flip-flop 35 is made "reset dominant", meaning that incoming "set" pulses are ignored as long as "reset" is asserted, transistor M1 will be held off as long as CONTROL remains below V1. In this way, one or more CLOCK pulses are prevented from actuating M1—thereby reducing the regulator's switching frequency. A duty ratio of zero can be achieved via this mechanism if, for example, the load current suddenly decreases to zero.

Figure 3B:
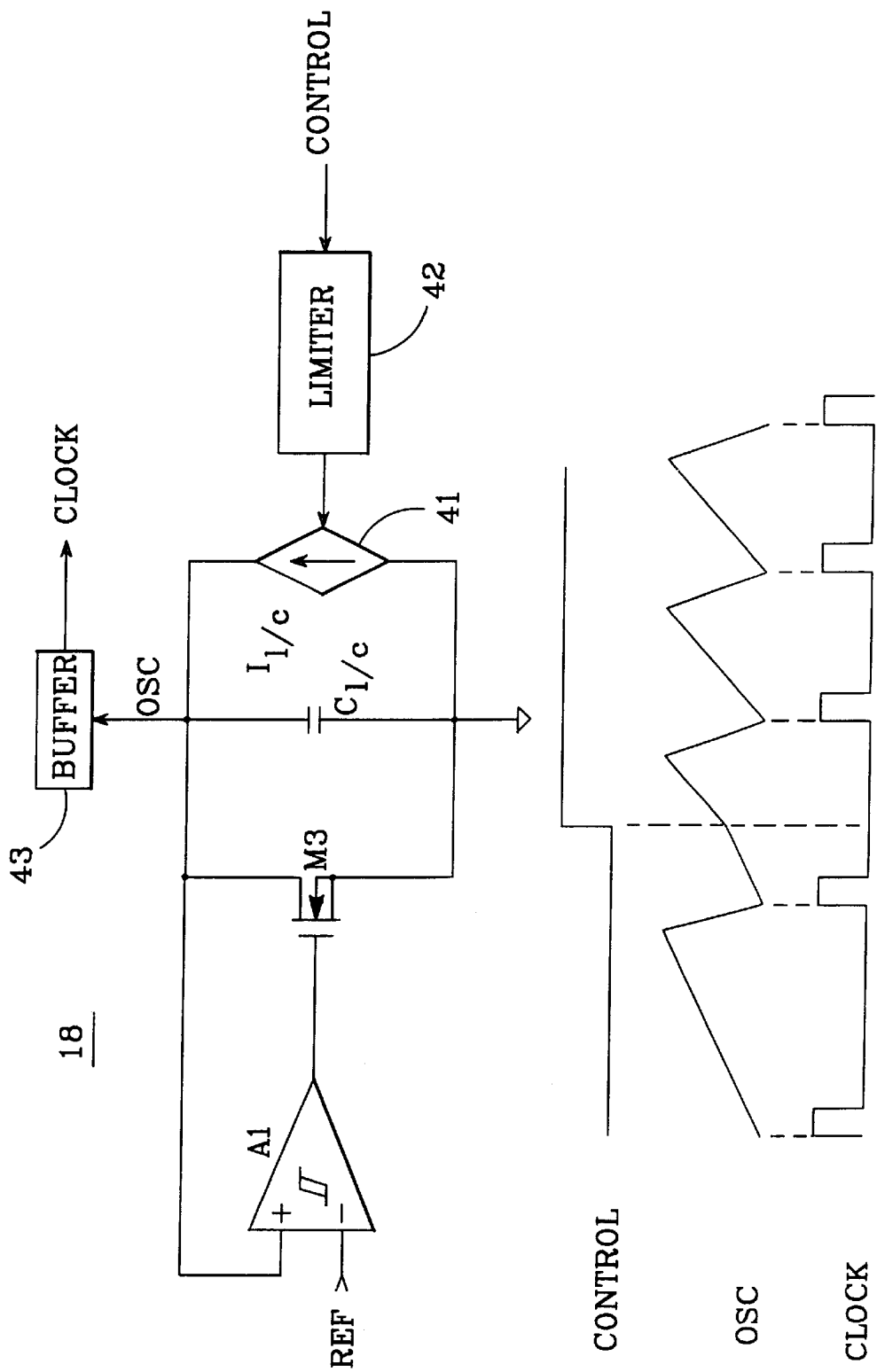
FIG. 3b is a schematic diagram of an exemplary variable frequency oscillator suitable for use with a tri-mode regulator per the present invention.

An exemplary embodiment of a variable frequency oscillator circuit 18 suitable for use with the preferred tri-mode regulator is shown in FIG. 3b. Here, a OSC signal is produced by repetitively charging and discharging a capacitor $C_{OSC}$. $C_{OSC}$ is charged with a current $I_{OSC}$ provided by a voltage-controlled current source 41, and is discharged by turning on a discharge device, preferably a transistor M3. M3 is controlled by a comparator A1, which turns on M3 when the OSC voltage increases up to a REF voltage applied to the comparator's non-inverting input. Comparator A1 is preferably arranged to employ hysteresis to ensure that $C_{OSC}$ is sufficiently discharged at the end of each switching cycle. The CONTROL voltage is passed through a limiter circuit 42, which imposes maximum and minimum limits on the voltage applied to current source 41, and thus on the frequency produced by oscillator circuit 18. The resulting OSC waveform is sawtooth in shape, with a frequency controlled by CONTROL in accordance with the FIG. 3a graph. The OSC signal is passed through a buffer circuit 43 to produce the digital CLOCK signal. Operation of oscillator circuit 18 for a varying CONTROL voltage is illustrated in the timing diagram of FIG. 3b, which shows how the frequency of OSC and CLOCK increase for an increasing CONTROL voltage.

Another method of determining when to transition between modes is to use the boundary between continuous inductor current mode (CCM) and discontinuous inductor current mode (DCM). DCM occurs when the inductor current reaches zero before the end of a switching cycle, which is an indication that the load current is decreasing. One possible circuit for detecting this condition is shown in FIG. 4. A comparator 45 receives a voltage $V_{SW}$ from the high side of inductor L at one input, and a reference voltage $V_{1sdv}$ at its other input. The comparator's output is connected to the set input of a positive edge-triggered set-reset flip flop 46. $V_{1sdv}$ is set to a value just less than 0 volts (e.g., −0.003 v). Voltage $V_{SW}$ dips below $V_{1sdv}$ when the high side driver signal (HS) falls, causing the comparator output (S) to toggle low. When $V_{SW}$ reaches $V_{1sdv}$, the comparator output toggles high, setting flip-flop 46 and disabling the drive signal to switch M2 via signal LSGD. The detection circuit is arranged to ensure that M2 is held off except when inductor current $I_L$ is greater than zero, thereby preventing the discharge of output capacitor C. Since LSGD provides an indication of when the regulator is in CCM or DCM, it can be provided as a control signal to the frequency control circuit 40, which can be arranged to use the signal to trigger transitions between Mode I and Mode II.

Note that triggering transitions between modes by monitoring the CONTROL voltage is preferred over detecting the CCM/DCM boundary, due to the ease with which the former method is implemented.

Referring back to FIG. 2, control circuit 14 preferably includes a means 50 of quickly triggering the regulator back into Mode I from Modes II or III. One possible means comprises a comparator 52 which receives feedback voltage $V_{FB}$ at one input and a reference voltage at its second input. The reference voltage is chosen to indicate the occurrence of a sudden increase in load current; a reference voltage of about $0.98V_{ref}$ is typically adequate. A sudden increase in load current results in a dip in $V_{FB}$; if the dip is sufficiently large, the output 54 of comparator 52 toggles. Frequency control circuit 40 is arranged to monitor output 54, and to immediately transition back to Mode I if operating in Modes II or III.

It is not essential that a means 50 be provided to trigger a transition back into Mode I. The CONTROL signal could also be used to trigger such a transition. However, the CONTROL signal changes relatively slowly in comparison with $V_{FB}$, and for a fast-changing increasing load, using CONTROL as a trigger could result in a significant dip in $V_{out}$. But if the regulator drives only slowly-varying loads, it may be possible to dispense with means 50.

Control circuit 14 includes a frequency compensation network 56 connected to the output of amplifier 16. Network 56 is needed to enable the CONTROL signal to provide an accurate indication of the absolute value of the load driven by the regulator's output voltage (rather than just an indication of the magnitude of load variations), and to improve the stability of the control loop. Network 56 can consist of just a single capacitor, though this will limit the speed with which the CONTROL signal can slew. A preferred compensation network 56 is shown in FIG. 2, comprising capacitors $C_a$ and $C_b$ and a resistor $R_b$. The combination of network 56 and amplifier 16 form a voltage-controlled current source having a gain equal to $g_m$. The source's driving voltage is the difference between $V_{ref}$ and $V_{FB}$, and its output is given by $g_m*(V_{ref}-V_{FB})$; as such, the current source can sink or source current at its output. The output current produces a voltage drop across compensation network 56, which seeks to reduce the difference between $V_{ref}$ and $V_{FB}$; this voltage is the CONTROL voltage. Note that the network shown in FIG. 2 is merely exemplary; the specific implementation of frequency compensation network 56 is application-specific.

Amplifier 16 is preferably a transconductance amplifier. However, a conventional voltage amplifier may also be used.

Figure 5:
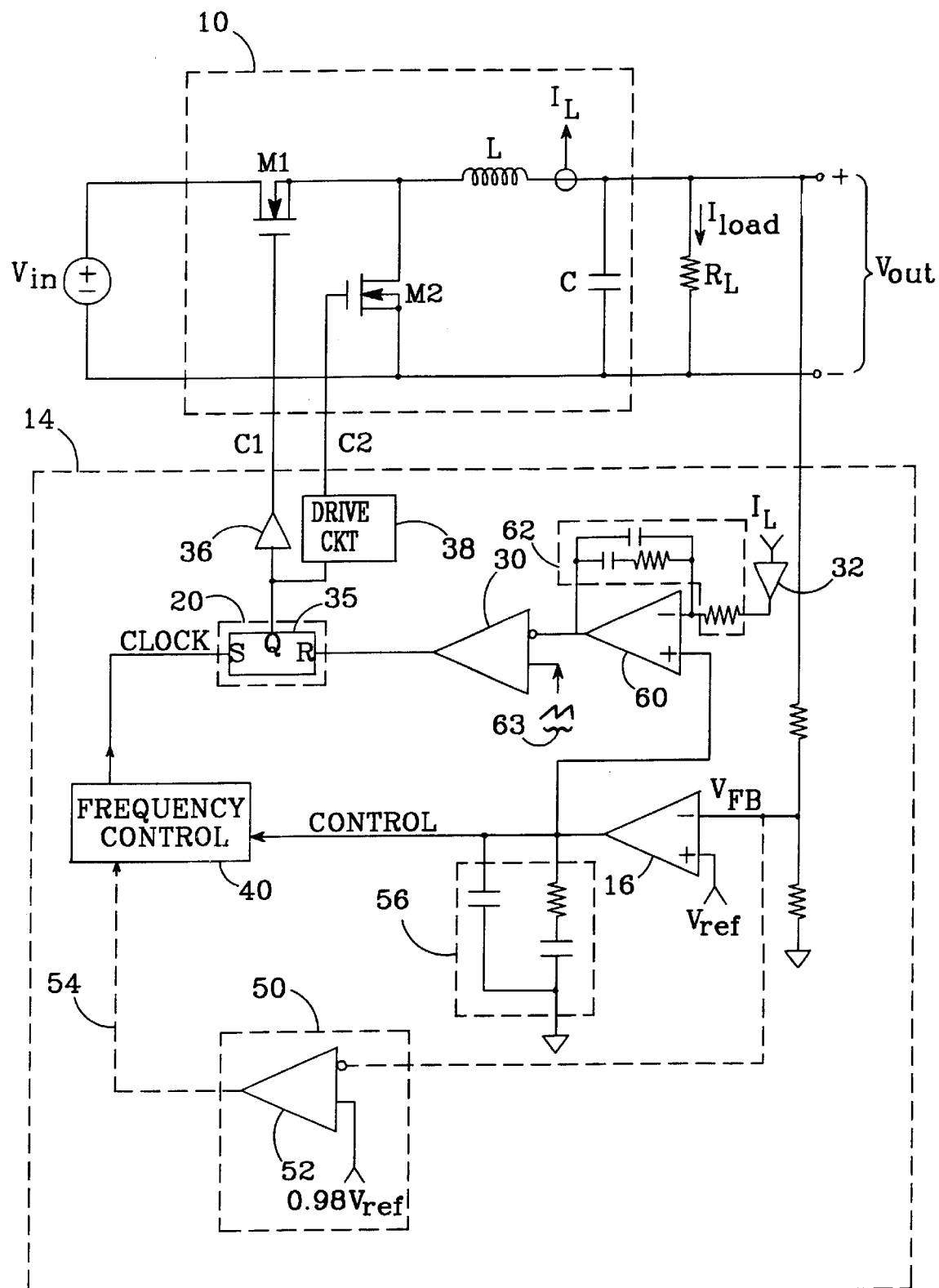
FIG. 5 is a schematic diagram of a switching voltage regulator per the present invention which employs average current mode control.

The invention is not limited to use with a switching voltage regulator configured to employ peak current mode control. It is equally useful with switching regulators arranged to use, for example, valley current mode control, average current mode control, and voltage mode control. The use of average current mode control with the present regulator is illustrated in FIG. 5. This configuration is similar to that in FIG. 2, except for the addition of a current error amplifier 60 between PWM comparator 30 and an inductor current sense signal $I_L$, which is best sensed on the output side of inductor L for this control mode for noise reduction. Amplifier 60 requires a frequency compensation network 62; an exemplary network is shown in FIG. 5. The output of amplifier 60 is provided to the inverting input of PWM comparator 30, and a sawtooth waveform 63 having a frequency which varies with CONTROL—derived, for example, from the OSC output of variable frequency oscillator circuit 18—is provided to the non-inverting input. The use of amplifier 60 and network 62 allows a higher current loop gain at lower frequencies than does peak current mode control, thereby improving regulator performance. The regulator employs dual modulation control as described above, using the CONTROL signal to vary the duty ratio and frequency of control signals C1 and C2 with load current. The regulator may also optionally employ tri-mode control as described above, such that dual modulation control is triggered only under predetermined conditions.

Figure 6:
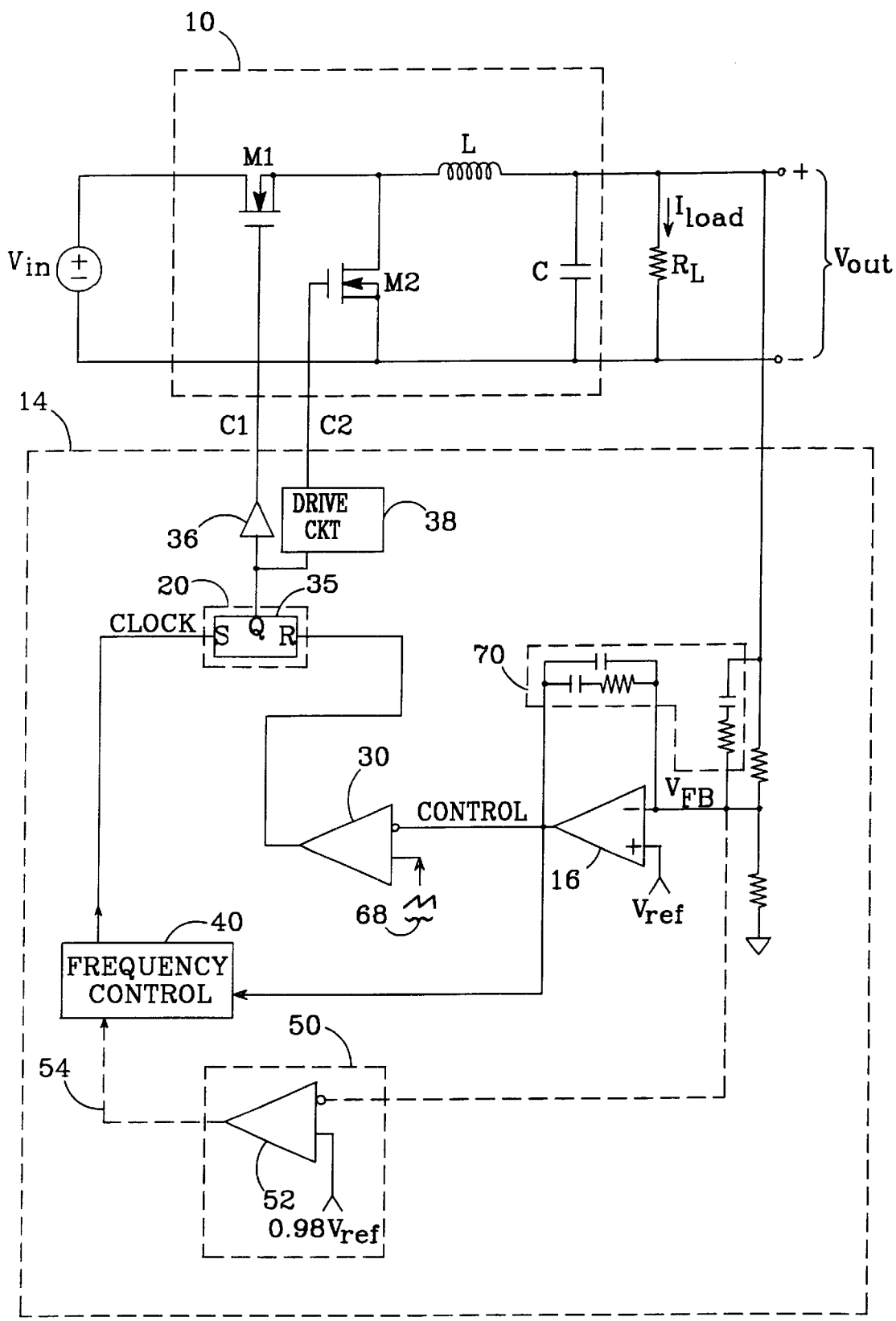
FIG. 6 is a schematic diagram of a switching voltage regulator per the present invention which employs voltage mode control.

The use of voltage mode control with the present regulator is illustrated in FIG. 6. This configuration is similar to that in FIG. 2, except that inductor current is not sensed. The output CONTROL of amplifier 16 is connected to the inverting input of PWM comparator 30, and compared with a sawtooth waveform 68 to determine duty ratio; for voltage mode control, sawtooth 68 has a frequency which varies with CONTROL and a peak amplitude which varies with $V_{in}$. The peak amplitude of sawtooth waveform 68 Amplifier 16 requires a frequency compensation network 70; an exemplary network is shown in FIG. 6.

Note that when using voltage mode control, the CONTROL signal is essentially constant when the regulator operates in CCM; dual modulation control will be ineffective under these conditions. However, if operating in DCM, the CONTROL signal will vary with load and dual modulation control can be employed. The regulator may also employ tri-mode control as described above, such that dual modulation control is triggered only under predetermined conditions.

Further note that, with voltage mode control, assuming CCM operation, the duty ratio normally varies with the input voltage in the absence of a voltage feedforward circuit. However, when using a voltage feedforward circuit, which increases or decreases the peak OSC voltage as the input voltage increases or decreases, dual modulation control functions in an optimum manner. Without voltage feedforward, extra circuitry may be required to get adequate performance.

Figure 7A:
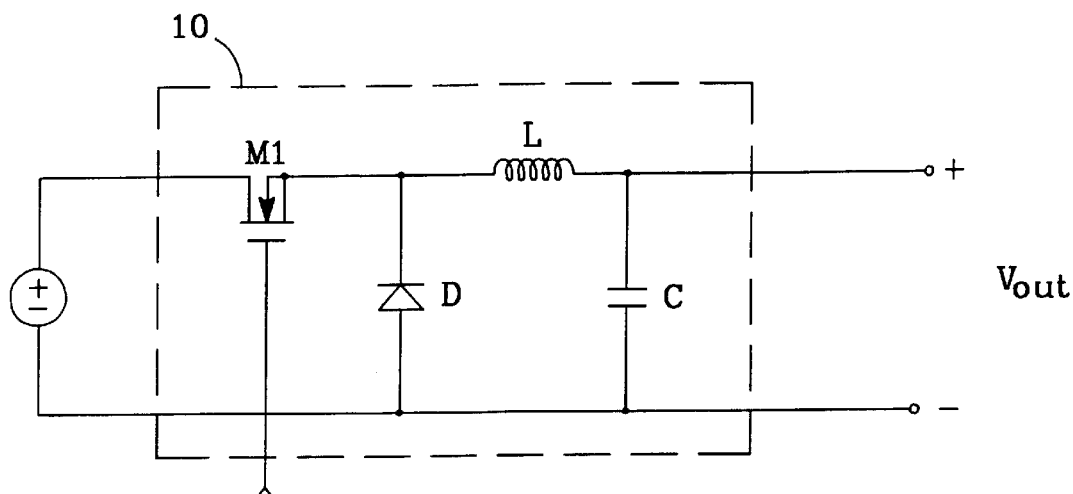
FIG. 7a is a schematic diagram of a "buck"-type power stage for a switching voltage regulator per the present invention.
Figure 7B:
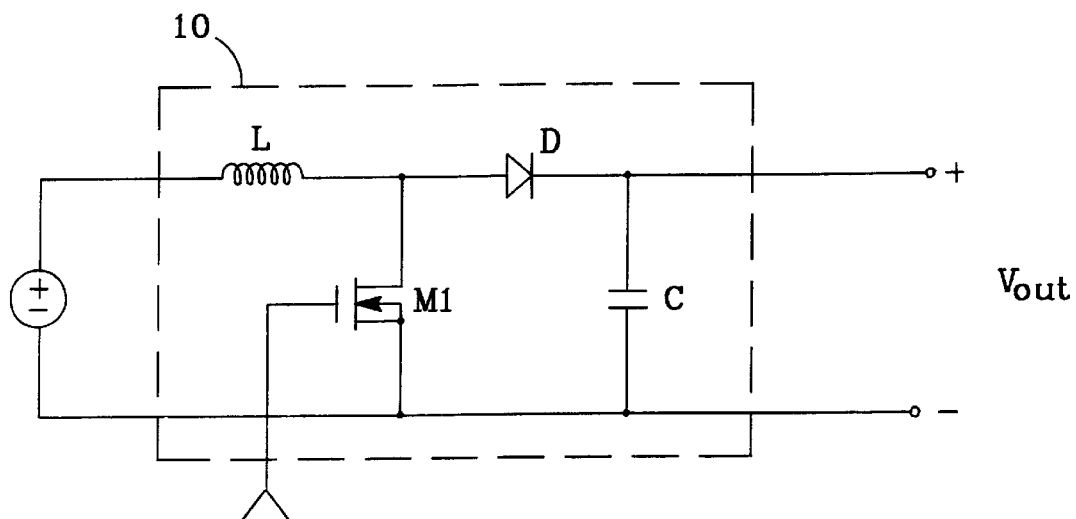
FIG. 7b is a schematic diagram of a "boost"-type power stage for a switching voltage regulator per the present invention.
Figure 7C:
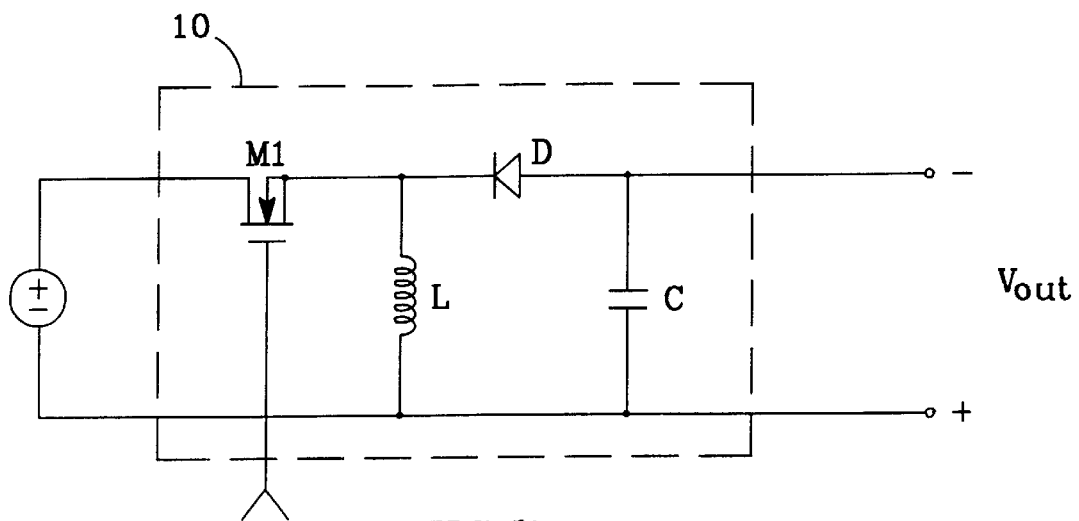
FIG. 7c is a schematic diagram of a "buck-boost"-type power stage for a switching voltage regulator per the present invention.

As noted above, the present regulator is useful with various power stage types in addition to the buck-type shown in FIGS. 2, 5 and 6. Three additional power stage types which may be used with the present regulator are shown in FIGS. 7a–7c. In FIG. 7a, power stage 10 is a buck-type which, for simplicity, uses a diode D instead of a second switching transistor or other type of active switch. FIG. 7b depicts a boost-type power stage 10, and FIG. 7c shows a buck-boost power stage 10. Note that the power stages of FIGS. 7b and 7c could use a second switching transistor or other type of active switch in place of diode D.

Note that though the specification only includes detailed descriptions of dual modulation control as used with peak current mode, average current mode, and voltage mode control schemes, the invention is not limited to use with these control modes. The invention might also be used with a switching regulator which employed, for example, a constant off-time control scheme.

While particular embodiments of the invention have been shown and described, numerous variations and alternate embodiments will occur to those skilled in the art. Accordingly, it is intended that the invention be limited only in terms of the appended claims.

We claim:
1. A switching voltage regulator, comprising:
   a power stage which includes at least one switch and an inductor, each of said switches responsive to respective control signals, said power stage connected between an input voltage source and an output voltage terminal, and
   a control circuit arranged to provide said control signals to said switches to maintain a desired output voltage at said output voltage terminal, said power stage and said control circuit forming a switching voltage regulator, said control circuit comprising:
      an amplifier arranged to provide an output CONTROL which varies with the difference between the voltage $V_{out}$ at said output voltage terminal and said desired output voltage,
      a compensation network connected to said CONTROL output and arranged such that CONTROL provides an accurate indication of the absolute value of a load driven by $V_{out}$,
      a variable frequency oscillator circuit arranged to provide an output signal CLOCK having a frequency f which varies with CONTROL, and
      a switch controller arranged to receive CLOCK and a signal which varies with CONTROL and to provide said control signals to said switches, said switch controller arranged to vary the duty ratio and the frequency of said control signals with CONTROL and f.

2. The regulator of claim 1, further comprising a load connected to said output terminal which conducts a current $I_{load}$, said at least one switch comprising first and second switches which close in response to first and second ones of said control signals, respectively, said power stage arranged such that said first switch when closed causes the current in said inductor to increase and said second switch when closed causes the current in said inductor to decrease, said switch controller arranged to reduce the duty ratio of said first control signal and reduce the frequency of said first and second control signals as $I_{load}$ decreases and to increase the duty ratio of said first control signal and increase the frequency of said first and second control signals as $I_{load}$ increases.

3. The regulator of claim 1, further comprising a load connected to said output terminal which conducts a current $I_{load}$, said at least one switch comprising a first switch which closes in response to a respective one of said control signals, said power stage arranged such that said first switch when closed causes the current in said inductor to increase, said switch controller arranged to reduce the duty ratio of said first control signal and the frequency of said control signals as $I_{load}$ decreases and to increase the duty ratio of said first control signal and the frequency of said control signals as $I_{load}$ increases.

4. The regulator of claim 3, wherein said switch controller comprises a set-reset flip-flop having its set input connected to CLOCK and its reset input connected to said signal which varies with CONTROL, said control signals derived from s aid flip-flop's Q output.

5. The regulator of claim 4, wherein said control circuit is arranged to provide peak current mode control of said regulator, said control circuit further comprising a PWM comparator connected to receive a first input which varies with the current in said inductor and a second input which varies with CONTROL and to produce said signal which varies with CONTROL and is connected to said reset input such that the duty ratio of said first control signal is reduced as $I_{load}$ decreases and is increased as $I_{load}$ increases.

6. The regulator of claim 5, wherein said amplifier is a transconductance amplifier.

7. The regulator of claim 4, wherein said control circuit is arranged to provide average current mode control of said regulator, said control circuit further comprising:
   a current error amplifier arranged to receive a first input which varies with the current in said inductor and a second input which varies with CONTROL and to produce an output which varies with the average inductor current, and
   a PWM comparator connected to receive the output of said current error amplifier at a first input and a sawtooth waveform having a frequency which varies with f at a second input and to produce said signal which varies with CONTROL and is connected to said reset input such that the duty ratio of said first control signal is reduced as $I_{load}$ decreases and is increased as $I_{load}$ increases.

8. The regulator of claim 4, wherein said control circuit is arranged to provide voltage mode control of said regulator, said control circuit further comprising a PWM comparator connected to receive a signal which varies with CONTROL at a first input and a sawtooth waveform having a frequency which varies with f at a second input and to produce said signal which varies with CONTROL and is connected to said reset input such that the duty ratio of said first control signal is reduced as $I_{load}$ decreases and is increased as $I_{load}$ increases.

9. The regulator of claim 4, wherein said set-reset flip-flop is a reset dominant set-reset flip-flop.

10. The regulator of claim 1, wherein said variable frequency oscillator circuit is arranged to produce said output signal CLOCK with frequency f equal to a first fixed frequency $f_1$ when CONTROL is greater than a first threshold value and to vary f with CONTROL when CONTROL is below said first threshold value.

11. The regulator of claim 1, wherein said variable frequency oscillator circuit is arranged to produce said output signal CLOCK with frequency f equal to a first fixed frequency $f_1$ when CONTROL is greater than a first threshold value and with frequency f equal to or less than a second fixed frequency $f_2$ which is less than $f_1$ when CONTROL is less than a second threshold value and to vary f with CONTROL when CONTROL is between said first and second threshold values.

12. The regulator of claim 1, further comprising a circuit which detects when the regulator operates in continuous inductor current mode (CCM) during which the current in said inductor remains greater than zero during a switching cycle and detects when the regulator operates in discontinuous inductor current mode (DCM) during which the current in said inductor reaches zero during a switching cycle, said variable frequency oscillator circuit arranged to produce said output signal CLOCK with frequency f equal to a first fixed frequency $f_1$ when said regulator operates in CCM and to vary f with CONTROL when said regulator operates in DCM.

13. The regulator of claim 1, wherein said output stage is a buck converter power stage.

14. The regulator of claim 1, wherein said output stage is a boost converter power stage.

15. The regulator of claim 1, wherein said output stage is a buck-boost converter power stage.

16. The regulator of claim 1, wherein said at least one switch comprises first and second switches, said control circuit arranged such that said first switch when closed causes the current in said inductor to increase and said second switch when closed causes the current in said inductor to decrease.

17. The regulator of claim 1, wherein said at least one switch comprises one switch, said power stage further comprising a diode, said control circuit and power stage arranged such that said switch when closed causes the current in said inductor to increase and said current in said inductor decreases through said diode when said first switch is off.

18. A switching voltage regulator employing peak current mode control, comprising:
   a power stage which includes first and second switches and an inductor, said switches responsive to first and second control signals, respectively, said power stage connected between an input voltage source and an output voltage terminal, and
   a control circuit arranged to provide said control signals to said switches to maintain a desired output voltage at said output voltage terminal, said power stage and said control circuit forming a switching voltage regulator, said control circuit comprising:
      an amplifier arranged to provide an output CONTROL which varies with the difference between the voltage $V_{out}$ at said output voltage terminal and said desired output voltage,
      a compensation network connected to said CONTROL output and arranged such that CONTROL provides an accurate indication of the absolute value of a load driven by $V_{out}$,
      a variable frequency oscillator circuit arranged to provide an output signal CLOCK having a frequency f which varies with CONTROL,
      a PWM comparator connected to receive a signal which varies with the current in said inductor at a first input and a signal which varies with CONTROL at a second input, and to produce an output signal which toggles when said first input signal increases to match the absolute value of said second input signal, and
      a set-reset flip-flop having its set input connected to CLOCK and its reset input connected to said PWM comparator output, said control signals derived from said flip-flop's Q output,
   said amplifier, PWM comparator and flip-flop arranged such that said CLOCK signal sets said flip-flop, thereby turning on said first switch and turning off said second switch such that the current in said inductor increases, and said PWM comparator output resets said flip-flop, thereby turning off said first switch and turning on said second switch such that the current in said inductor decreases, such that the peak current in said inductor is controlled and the duty ratio and frequency of said control signals vary with CONTROL and f.

19. The regulator of claim 18, further comprising a load connected to said output terminal which conducts a current $I_{load}$ said power stage arranged such that said first switch when closed causes the current in said inductor to increase and said second switch when closed causes the current in said inductor to decrease, said control circuit arranged to reduce the duty ratio of said first control signal and reduce the frequency of said first and second control signals as $I_{load}$ decreases and to increase the duty ratio of said first control signal and increase the frequency of said first and second control signals as $I_{load}$ increases.

20. The regulator of claim 18, wherein said amplifier is voltage amplifier.

21. The regulator of claim 18, wherein said amplifier is a transconductance amplifier.

22. The regulator of claim 18, further comprising a frequency compensation network connected to the output of said amplifier.

23. The regulator of claim 22, wherein said frequency compensation network comprises a first capacitor connected between said amplifier output and a circuit common point, and a resistor and a second capacitor connected in series between said amplifier output and a circuit common point.

24. The regulator of claim 18, wherein said set-reset flip-flop is a reset dominant set-reset flip-flop.

25. The regulator of claim 18, wherein said variable frequency oscillator circuit is arranged to produce said output signal CLOCK with frequency f equal to a first fixed frequency $f_1$ when CONTROL is greater than a first threshold value and to vary f with CONTROL when CONTROL is below said first threshold value.

26. The regulator of claim 18, wherein said variable frequency oscillator circuit is arranged to produce said output signal CLOCK with frequency f equal to a first fixed frequency $f_1$ when CONTROL is greater than a first threshold value and with frequency f equal to or less than a second fixed frequency $f_2$ which is less than $f_1$ when CONTROL is less than a second threshold value, and to vary f with CONTROL when CONTROL is between said first and second threshold values.

27. The regulator of claim 18, further comprising a circuit which detects when the regulator operates in continuous inductor current mode (CCM) during which the current in said inductor remains greater than zero during a switching cycle and detects when the regulator operates in discontinuous inductor current mode (DCM) during which the current in said inductor reaches zero during a switching cycle, said variable frequency oscillator circuit arranged to produce said output signal CLOCK with frequency f equal to a first fixed frequency $f_1$ when said regulator operates in CCM and to vary f with CONTROL when said regulator operates in DCM.

28. The regulator of claim 27, further comprising an output capacitor connected to said output terminal, said regulator arranged such that said first switch when closed causes the current in said inductor to increase and said second switch when closed causes the current in said inductor to decrease, said control circuit arranged to turn off said second switch while the regulator operates in DCM to prevent said second switch from discharging said output capacitor.

29. The regulator of claim 18, wherein said output stage is a buck converter power stage.

30. The regulator of claim 18, wherein said output stage is a boost converter power stage.

31. The regulator of claim 18, wherein said output stage is a buck-boost converter power stage.

32. A switching voltage regulator employing peak current mode control, comprising:

a power stage which includes a switch, a diode, and an inductor, said switch responsive to a control signal, said power stage connected between an input voltage source and an output voltage terminal, said power stage arranged such that the current in said inductor increases when said switch is on and decreases via said diode when said switch is off, and a control circuit arranged to provide said control signal to said switch to maintain a desired output voltage at said output voltage terminal, said power stage and said control circuit forming a switching voltage regulator, said control circuit comprising:

an amplifier arranged to provide an output CONTROL which varies with the difference between the voltage $V_{out}$ at said output voltage terminal and said desired output voltage, a compensation network connected to said CONTROL output and arranged such that CONTROL provides an accurate indication of the absolute value of a load driven by $V_{out}$, a variable frequency oscillator circuit arranged to provide an output signal CLOCK having a frequency f which varies with CONTROL, a PWM comparator connected to receive a signal which varies with the current in said inductor at a first input and a signal which varies with CONTROL at a second input, and to produce an output signal which toggles when said first input signal increases to match the absolute value of said second input signal, and a set-reset flip-flop having its set input connected to OSC and its reset input connected to said PWM comparator output, said control signal derived from said flip-flop's Q output, said amplifier, PWM comparator and flip-flop arranged such that said CLOCK signal sets said flip-flop, thereby turning on said first switch such that the current in said inductor increases, and said PWM comparator output resets said flip-flop, thereby turning off said first switch such that the current in said inductor decreases, such that the peak current in said inductor is controlled and the duty ratio and frequency of said control signal varies with CONTROL and f.

* * * * *